United States Patent [19]

Liu

[11] Patent Number: 5,124,885
[45] Date of Patent: Jun. 23, 1992

[54] PERSONAL COMPUTER WITH AN UPSTANDING STRUCTURE

[75] Inventor: Morgan C. Liu, Taoyuan, Taiwan

[73] Assignee: Enlight Corporation, Taoyuan, Taiwan

[21] Appl. No.: 748,452

[22] Filed: Aug. 22, 1991

[51] Int. Cl.⁵ .................. H05K 7/14; A47B 47/02
[52] U.S. Cl. ............................ 361/391; 361/380; 361/392; 361/427; 312/263
[58] Field of Search ............ 364/708; 312/263; 361/356, 380, 390, 392, 395, 399, 427, 391

[56] References Cited

U.S. PATENT DOCUMENTS

| | | | |
|---|---|---|---|
| 4,201,428 | 5/1980 | Johnson | 312/263 X |
| 4,620,684 | 11/1986 | Delpercio et al. | 312/263 X |
| 4,874,210 | 10/1989 | Carroll | 312/263 X |
| 5,031,070 | 7/1991 | Hsu | 361/380 |

Primary Examiner—Leo P. Picard
Assistant Examiner—Michael W. Phillips
Attorney, Agent, or Firm—Ladas & Parry

[57] ABSTRACT

A personal computer with an upstanding structure comprises a U-shaped base frame and a support bracket, wherein the base frame constituted by a bottom plate, a front plate, and a rear plate; the support bracket is fixed between the front and rear plates of the base frame to install a conventional 5¼" floppy disk drive bracket and a power supply thereon, to install a 3½" floppy disk drive bracket and a hard disk drive bracket thereunder. A card guide bracket which is used to install a speaker and a fan, and to guide interface cards is attached on the inner surface of the front plate of the base frame. A mother board mounting plate having a slidable snap-on fastener to secure on the support bracket is guided and positioned by a pair of guiding blocks formed on a lateral side of the bottom plate of the base frame and pushed into be secured by the snap-on fastener to a vertical disposition.

8 Claims, 6 Drawing Sheets

PERSONAL COMPUTER WITH AN UPSTANDING STRUCTURE

BACKGROUND OF THE INVENTION

This invention relates to a personal computer and in particular to one having an upstanding structural arrangement of the parts thereof, wherein the parts are fixed by readily releasable retaining means.

Generally speaking, a computer is the assemblage of mechanical and electronic components, including of mechanical and electronic components, including illustratively disk drives (both hard and floppy disk drives), mother board on which chips, such as the CPU, floating point coprocessor, RAMs (random access memories) and ROMs (read only memories) are integrated, control card, and if appropriate, ventilation fan. Having a personal computer, especially a desk top one, occupies less space, thus, a compact arrangement of the parts thereof is of importance. For those personal computers known in the art, the arrangement of components thereof is made as compact as possible without accounting for the expansibility thereof and thus resulting in trouble with maintaining the machines and changing parts thereof and constraining further expansion of the machines.

Furthermore, to minimize the size of an upstanding personal computer, the interior space above the mother board is utilized to the most compact extent. This, although effectively reducing the size, increases the time and labor in maintenance or installation. An improvement is made by installing the mother board in a supporting frame and then securing the supporting frame in the computer casing or base. Some of the known personal computers of this type use screws to secure the supporting frame. This type of securing means, however, is time-consuming in installation and thus maintenance. Some other known personal computers use a vertically slidable supporting frame to install the mother board. To provide slidability, much more space should be preserved for the supporting frame. This adversely affects the utilization of the interior of the computer. Besides, it is also very difficult to install a mother board with components of larger size thereon because of the slide of the mother board with respect to the other components of the computer. Moreover, the larger sized components on the mother board may be damaged by collision during installation or dismantlement.

SUMMARY OF THE INVENTION

It is therefore an object of the present invention to provide a personal computer with an upstanding structure which provides no such drawbacks as mentioned above.

Another object of the present invention is to provide a personal computer with an upstanding structure wherein a 3½" hard disk drive bracket is attached to a support bracket and a card guide bracket is attached to the inner side of the front plate with respectively and readily releasable retaining means so as to be installed and dismantled efficiently.

A further object of the present invention is to provide a personal computer with an upstanding structure which provides an optimum arrangement of the components inside the interior of the computer.

Yet another object of the present invention is to provide a personal computer with an upstanding structure of which the maintenance and change of parts is easy and convenient.

It is another object of the present invention to provide a personal computer with an upstanding structure wherein a card guide bracket is equipped with a fan together with another fan inherently provided in the power supply to produce heat convection so as to increase heat dissipating efficiency and to ensure the electronic components function in a normal condition.

It is still the further object of the present invention to provide a personal computer with an upstanding structure in which the mother board mounting plate is installed by a simple push-in action and is secured by snap-on type fastener.

These and other objects, advantages and features of the present invention will be more fully understood and appreciated with by reference to the written specification and appended drawings.

DETAILED DESCRIPTION OF THE INVENTION

Figure 1:
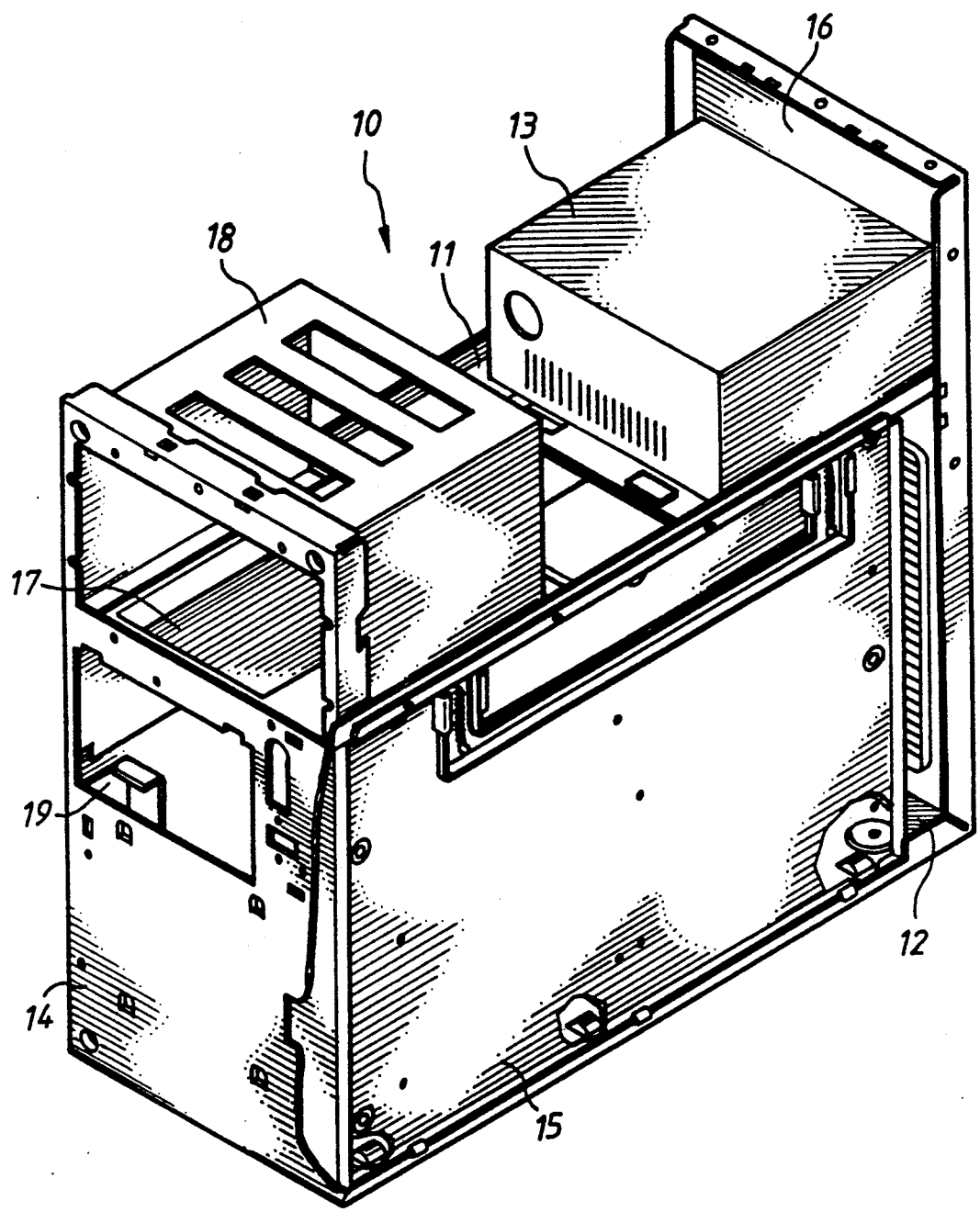
FIG. 1 is a perspective view of a personal computer with an upstanding structure in accordance with the present invention illustrating the component parts in an assembled condition.
Figure 2:
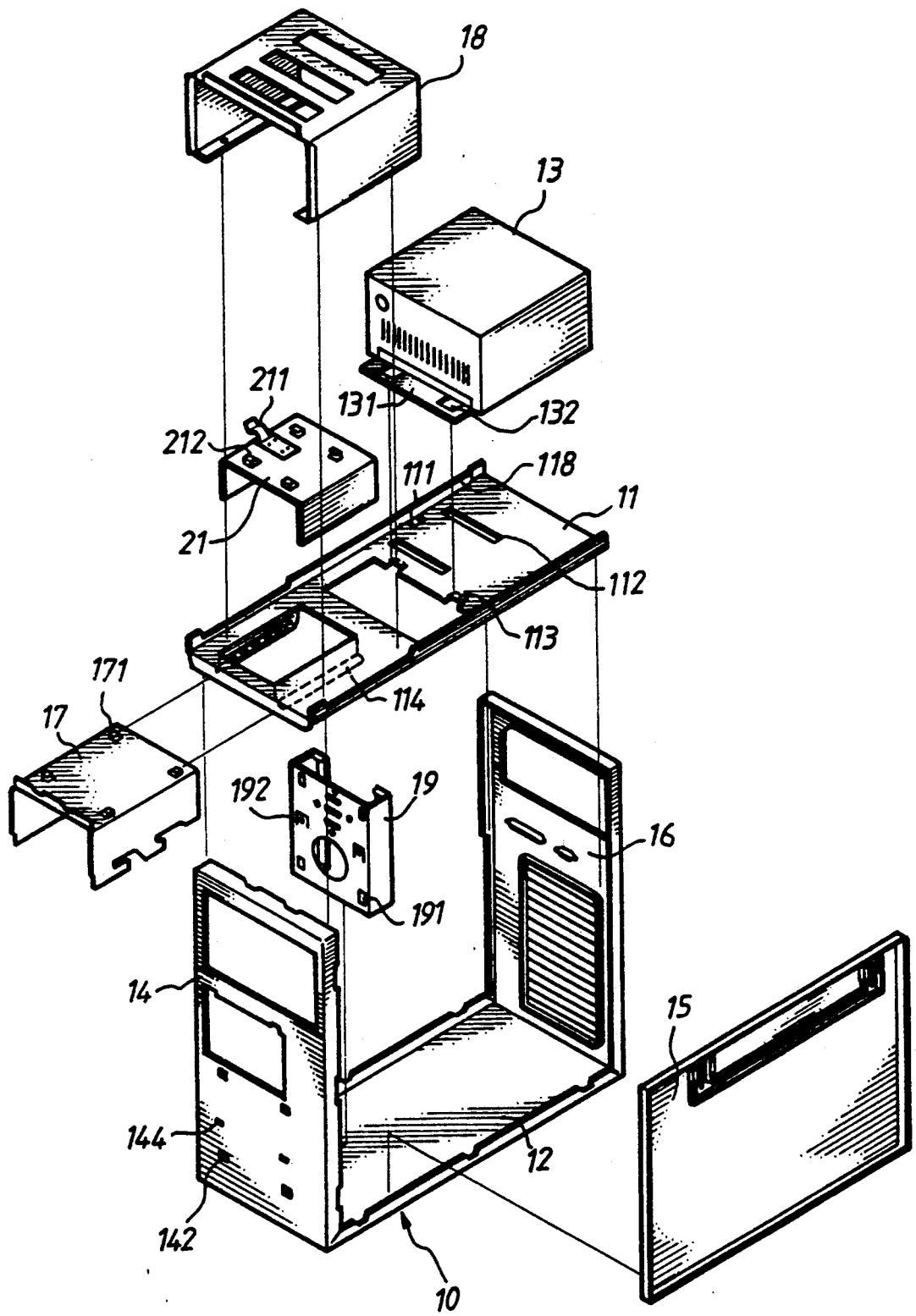
FIG. 2 is an exploded view of the personal computer shown in FIG. 1.

With reference to the drawings and in particular to FIGS. 1 and 2, a personal computer in accordance with the present invention comprises a casing (not shown), inside which a base frame 10 consituted by a bottom plate 12, a front plate 14 and a rear plate 16 is fixed. A support bracket 11 is disposed and secured between the front plate 14 and rear plate 16 with a pair of first hangers 114, each of which is an L-shaped strip longitudinally formed on the underside thereof, and a pair of second hangers 112, each of which is an L-shaped strip transversely formed on the underside thereof. The first hangers 114 are located in proximity to the front plate 14; and the second hangers 112 are located in proximity to the rear plate 16 with a slot 111 formed therebetween close to a lateral edge 118 of the support bracket 11. A 3½" floppy disk drive bracket 17 with a plurality of first hook-like members 171 thereon, which are separately located in two lines corresponding to the first hangers 114 so as to be slidable on and engageable with the first hangers 114, slides into engagement with the first hangers 114 and the front side of the 3½" floppy disk drive bracket 17 is secured on the front plate 14 with any known means.

Figure 3:
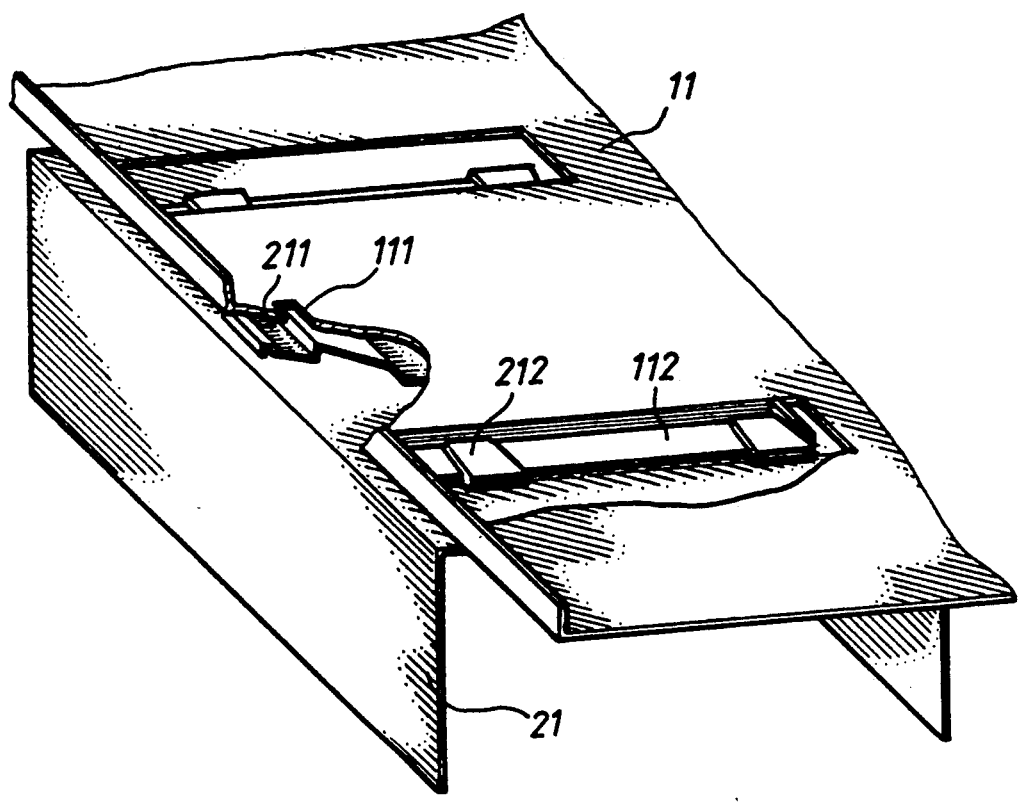
FIG. 3 is an enlarged view of a portion of a support bracket illustrating the securing of a hard disk drive bracket.

Further referring to FIG. 3, a hard disk drive bracket 21 with a plurality of second hook-like members 212 thereon, which are separately located in two lines corresponding to the second hangers 112 so as to be slidable on and engageable with the second hangers 112, slides into engagement with the second hangers 112 from the first lateral edge of the support bracket 11. A resilient snap catch 211 is formed on the hard disk drive bracket 21 at a location corresponding to the slot 111 of the support bracket 11, so that when the hard disk drive bracket 21 slides into engagement with the second hangers 112, the snap catch 211 engages the slot 111 and thus secures the hard disk drive bracket 21.

On the upper side of the support bracket 11, a pair of third hook-like members 113 are formed between the first hangers 114 and the second hangers 112 to respectively engage a slit 132 formed on a securing flange 131 of a power supply 13. With the slits 132 hooked on by the third hook-like members 113, the power supply 13 is disposed on the upper side of the support bracket 11 in proximity to the rear plate 16 and is further secured on the rear plate 16 with any known means.

A conventional 5¼" floppy disk drive bracket 18, inside which at least a disk drive (not shown) can be installed, is disposed on the upper side of the support bracket 11 and comes into contact with the front plate 14 to secure thereon with any known means.

Figure 4:
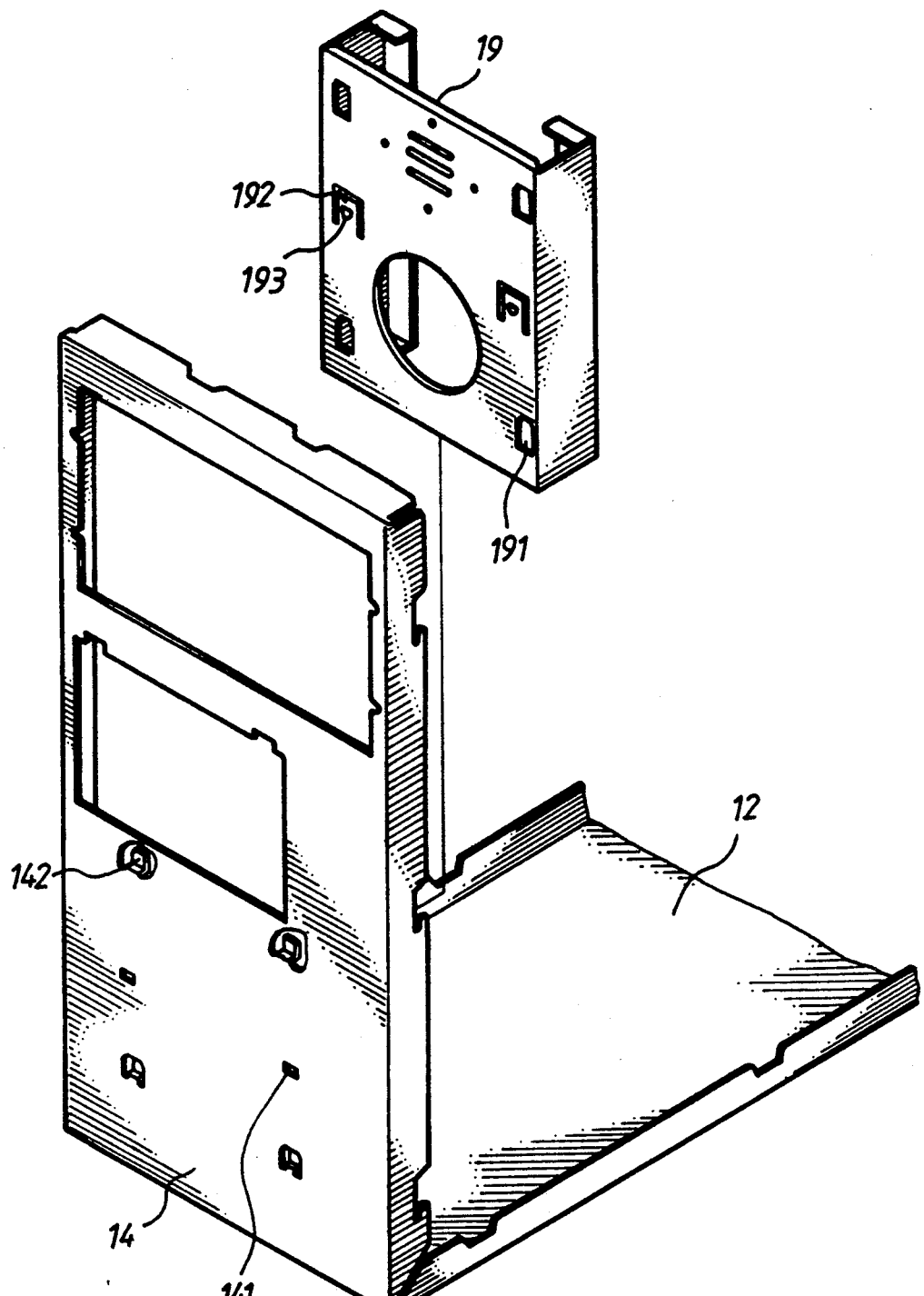
FIG. 4 is an enlarged view of a portion of a base frame together with a card guide bracket to show the relative positions thereof.

With reference further to FIG. 4, a card guide bracket 19, which is used to install a speaker (not shown) and a fan (not shown), and to guide interface cards (not shown), is disposed on the inside surface of the front plate 14 below the 3½" floppy disk drive bracket 17. The card guide bracket 19 has a plurality of openings 191 formed thereon respectively at locations corresponding to a plurality of fourth hook-like members 142 formed on the front plate 14 so as to be hung thereon. A pair of resilient plates 192 each having a knobble 193 thereon are formed on the card guide bracket 19. A pair of positioning slots 141 are formed on the front plate 14 at locations corresponding to the knobbles 193 so that when the card guide bracket 19 is disposed and hung on the forth hook-like members 142, the knobbles 193 are in engagement with the positioning slots 141.

Figure 5:
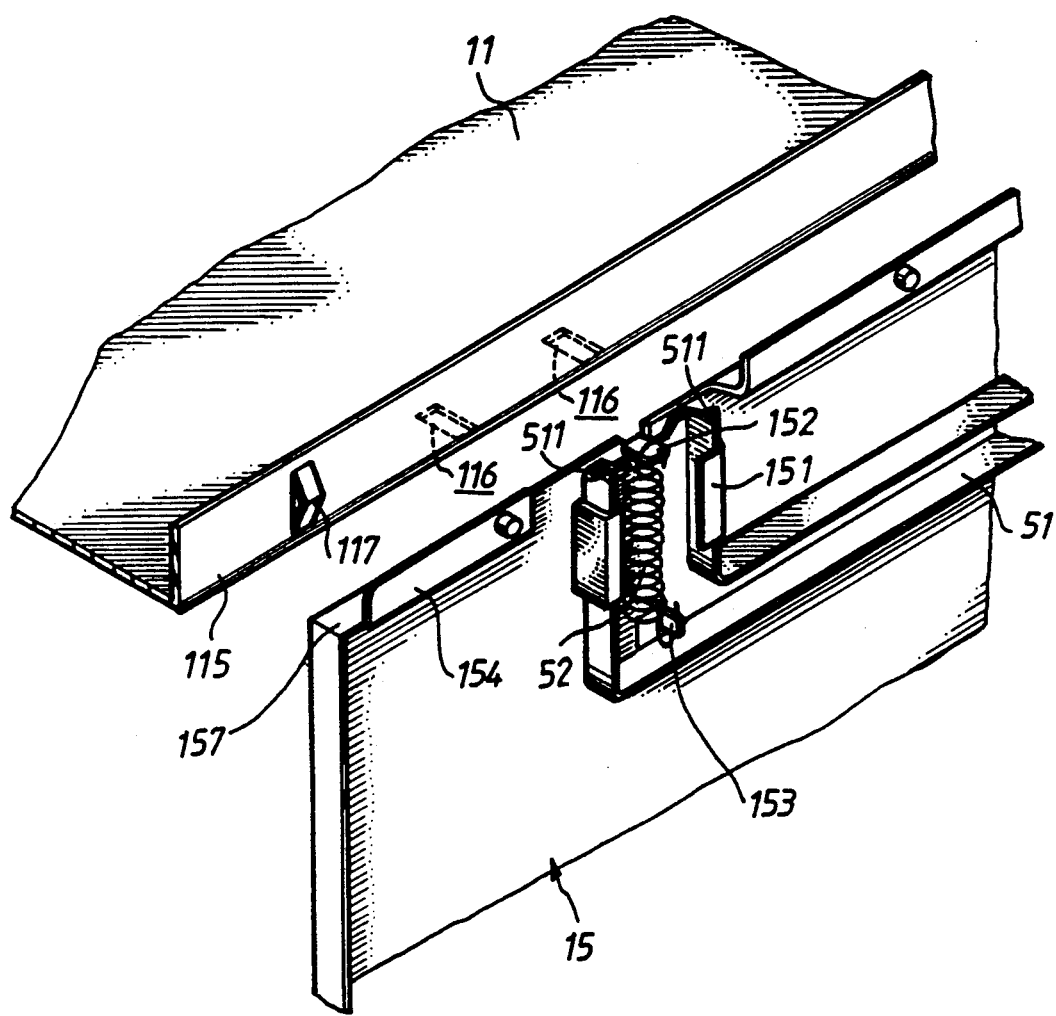
FIG. 5 is an enlarged view of a portion of the base frame and a mother board mounting plate to show the relative positions thereof.
Figure 6:
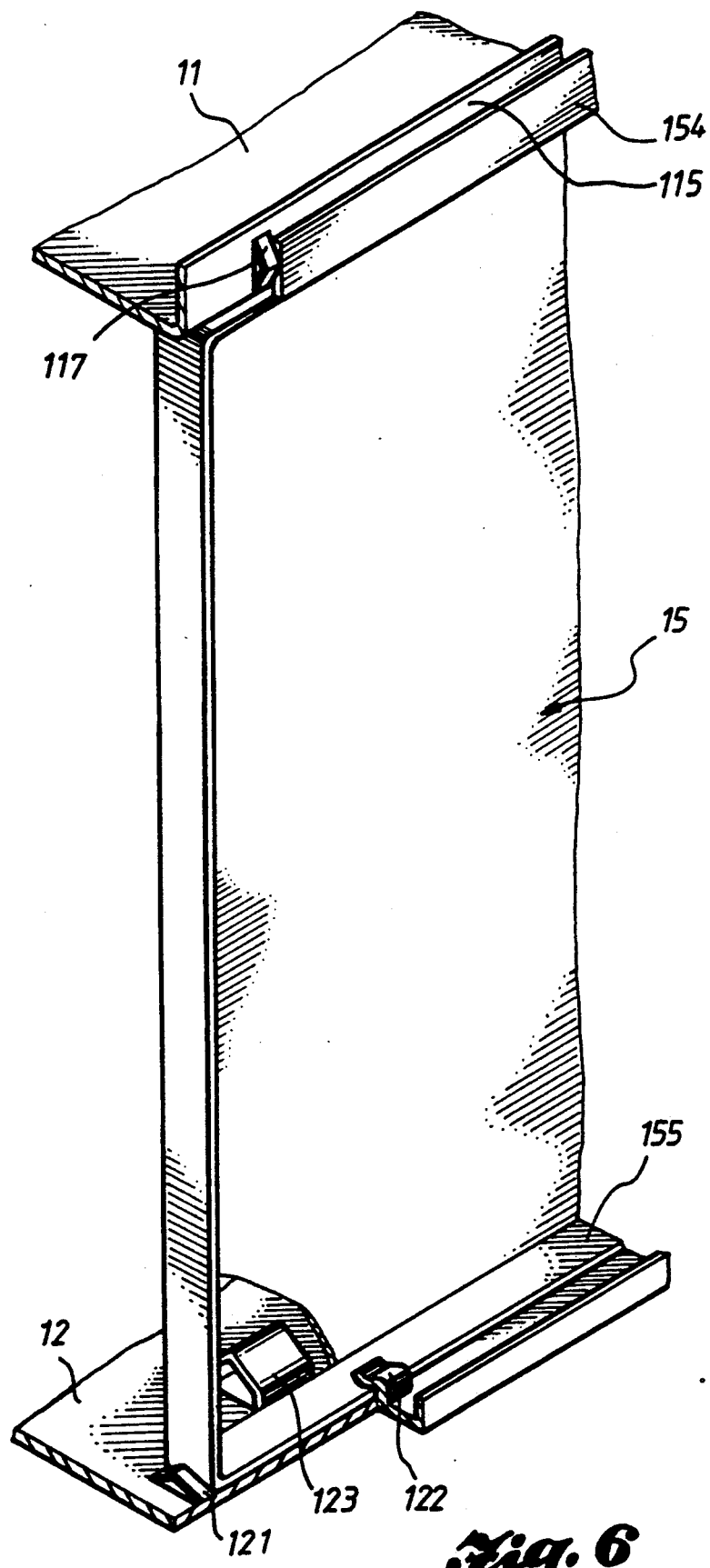
FIG. 6 is a perspective view of a portion of the base frame, the mother board mounting plate and the support bracket to show the guiding and securing of the mother board mounting plate.

In FIGS. 5 and 6, a mother board mounting plate 15 is a rectangular pan-like member with two guiding members 151 formed on one side thereof close to the support bracket 11. A U-shaped slidable fastener 51 comprises a horizontal section and two vertical sections of which each of the vertical sections has a pair of protruding lugs 511 formed in the end thereof. An extension spring 52 with one end thereof secured on a first projection 152 formed on the mother board mounting plate 15 and the other end thereof secured on a second projection 153 formed on the slidable fastener 51 causes the slidable fastener 51 to move upwards and downwards. It should be noted that the protruding lugs 511 are out of the top edge 157 of the mother board mounting plate 15 in a normal condition.

To install the mother board mounting plate 15, the bottom edge 155 of the mother board mounting plate 15 is first disposed into at least one resilient gripper 122 formed on the bottom plate 12 and then being pivoted forward substantially with respect to the gripper 122 so as to have the bottom edge 155 slide along the surface of at least one positioning block 123 and thus forcing the bottom edge 155 further into the gripper 122 and be gripped therein. Besides, the protruding lugs 511 will move downward by the pressing of the support bracket 11 when they come into contact the flange 115 of the support bracket 11 and continually pushing the mother board mounting plate 15 so that the protruding lugs 511 are received into corresponding holes 116 formed on the support bracket 11 to attain the engagement. The further movement of the mother board mounting plate 15 is prevented by a flange 154 vertically extended along the top edge 157 of the mother board mounting plate 15 in combination with the flange 115 of the support bracket 11. Further, a pair of guiding blocks 117 and 121 are respectively formed on the flange 115 of the support bracket 11 and the bottom plate 12 to further guide the installation of the mother board mounting plate 15.

Of course it is understood that the above is merely a preferred embodiment of the invention and that various changes and alterations can be made without departing from the spirit and broader aspects thereof as set forth in the appended claims.

I claim:

1. A personal computer with an upstanding structure comprising:
    a base frame constituted by a bottom plate, a front plate and a rear plate;
    a support bracket disposed and secured between said front and rear plates of the base frame, said support bracket having an upper side and an under side;
    a 5¼" floppy disk drive bracket disposed and secured on the upper side of said support bracket and in contact with said front plate;
    a power supply disposed and secured on the upper side of said support bracket and in proximity to said rear plate;
    a 3½" floppy disk drive bracket disposed on the under side of said support bracket and a front edge thereof secured to said front plate;
    a hard disk drive bracket releasably disposed and secured on the under side of said support bracket and in proximity to said rear plate;
    a card guide bracket releasably disposed and secured on an inside surface of said front plate and below said 3½" floppy disk drive bracket; and
    a mother board mounting plate which is upstanding and is disposed between said support bracket and said bottom plate.

2. A personal computer as claimed in claim 1, wherein said support bracket has a pair of hangers on the under side thereof, and said 3½" floppy disk drive bracket has a plurality of hook-like members corresponding to said hangers so that said 3½" floppy disk drive bracket is slidably with respect to said support bracket and fixed thereon with said hook-like members engaging with said hangers.

3. A personal computer as claimed in claim 1, wherein said support bracket has a pair of hangers and a slot therebetween on the under side thereof, and said hard disk drive bracket has a plurality of hook-like members corresponding to said hangers and a resilient snap catch corresponding to said slot so that said hard disk drive bracket is slidable with respect to said support bracket and fixed thereon with said hook-like members engaging with said hangers and said hard disk drive bracket is secured on said support bracket with said resilient snap catch engaging said slot.

4. A personal computer as claimed in claim 1, wherein said support bracket has a pair of hook-like members formed on the upper side thereof to respectively hook on a corresponding slit formed on flange of said power supply so as to secure said power supply.

5. A personal computer as claimed in claim 1, wherein said card guide bracket has a plurality of openings to be respectively hooked on by a corresponding hook-like member disposed on said inside surface of the front plate and a pair of resilient plates each having a knobble thereon being disposed on said card guide bracket to respectively engage with a corresponding positioning slot formed on said front plate.

6. A personal computer as claimed in claim 1, wherein said mother board mounting plate has a slidable fastener disposed on one side and in proximity to a top edge thereof which is close to said support bracket, said slidable fastener being spring-based to engage with a counterpart retaining means disposed on said support bracket and a bottom edge of said mother board mounting plate opposite to said top edge is disposed and fixed between at least one combination of gripper and positioning block disposed on said bottom plate, whereby said mother board mounting plate is upstanding between said support bracket and said bottom plate.

7. A personal computer as claimed in claim 6, wherein said slidable fastener is a U-shaped member comprising a horizontal section and two vertical sections, of which each of the vertical section is guided by guiding means and attached to said mother board mounting plate with an extension spring so as to be slidable with respect to said guiding means.

8. A personal computer as claimed in claim 7, wherein each of said vertical sections has lugs protruding from the end thereof and said counterpart retaining means is holes in said support bracket corresponding to said protruding lugs so as to respectively receive said protruding lugs therein to secure said mother board mounting plate.

* * * * *